US012131894B2

(12) United States Patent
Denton et al.

(10) Patent No.: US 12,131,894 B2
(45) Date of Patent: Oct. 29, 2024

(54) VIRTUAL SLIT CYCLOIDAL MASS SPECTROMETER

(71) Applicants: DUKE UNIVERSITY, Durham, NC (US); ARIZONA BOARD OF REGENTS ON BEHALF OF THE UNIVERSITY OF ARIZONA, Tucson, AZ (US)

(72) Inventors: M. Bonner Denton, Tucson, AZ (US); Jason Amsden, Durham, NC (US); Rafael Bento Serpa, Durham, NC (US); Charles Parker, Durham, NC (US); Elettra Piacentino, Durham, NC (US); Rob Kingston, Tucson, AZ (US); Scott Tilden, Tucson, AZ (US); Roger Sperline, Tucson, AZ (US); Justin Keogh, Tucson, AZ (US)

(73) Assignees: DUKE UNIVERSITY, Durham, NC (US); ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 369 days.

(21) Appl. No.: 17/827,440

(22) Filed: May 27, 2022

(65) Prior Publication Data

US 2024/0290604 A1 Aug. 29, 2024

Related U.S. Application Data

(60) Provisional application No. 63/193,816, filed on May 27, 2021.

(51) Int. Cl.
*H01J 49/32* (2006.01)
*H01J 49/02* (2006.01)

(52) U.S. Cl.
CPC .......... *H01J 49/328* (2013.01); *H01J 49/022* (2013.01); *H01J 49/025* (2013.01)

(58) Field of Classification Search
CPC ....... H01J 49/328; H01J 49/022; H01J 49/025
USPC .......................................................... 250/294
See application file for complete search history.

(56) References Cited

U.S. PATENT DOCUMENTS

| | | | | |
|---|---|---|---|---|
| 5,155,357 | A * | 10/1992 | Hemond ............ | H01J 49/0022 250/281 |
| 6,809,313 | B1 | 10/2004 | Gresham et al. | |
| 7,511,278 | B2 | 3/2009 | Scheidemann et al. | |
| 2019/0333747 | A1* | 10/2019 | Christian ............... | H01J 49/24 |

OTHER PUBLICATIONS

Amsden et al., "Single Particle Mass Spectrometry with a Cycloidal Mass Analyzer," Amsden Tech Connect Poster, 2019.

(Continued)

*Primary Examiner* — Kiet T Nguyen
(74) *Attorney, Agent, or Firm* — Quarles & Brady, LLP

(57) ABSTRACT

A virtual slit cycloidal mass spectrometer and spectrometry methods are disclosed. The spectrometer size-selects particles, which in turn serve as a "virtual slit" for a cycloidal mass analyzer. This virtual slit provides unprecedented resolution in a system that takes up a much smaller physical footprint than was previously achievable. This spectrometer may facilitate field sampling of isotopes, such as uranium isotopes.

20 Claims, 6 Drawing Sheets
(5 of 6 Drawing Sheet(s) Filed in Color)

(56) References Cited

OTHER PUBLICATIONS

Amsden, J. J.; Herr, P. J.; Landry, D. M. W.; Kim, W.; Vyas, R.; Parker, C. B.; Kirley, M. P.; Keil, A. D.; Gilchrist, K. H.; Radauscher, E. J.; Hall, S. D.; Carlson, J. B.; Baldasaro, N.; Stokes, D.; Di Dona, S. T.; Russell, Z. E.; Grego, S.; Edwards, S. J.; Sperline, R. P.; Denton, M. B.; Stoner, B. R.; Gehm, M. E.; Glass, J. T., Proof of Concept Coded Aperture Miniature Mass Spectrometer Using a Cycloidal Sector Mass Analyzer, a Carbon Nanotube (CNT) Field Emission Electron Ionization Source, and an Array Detector. J Am Soc Mass Spectrom 2018, 29 (2), 360-372.
Betti, M., G. Tamborini, and L. Koch, Use of Secondary Ion Mass Spectrometry in Nuclear Forensics Analysis for the Characterization of Plutonium and Highly Enriched Uranium Particles. Analytical Chemistry, 1999, 71(14): p. 2616-2622.
Bleakney et al., "A New Mass Spectrometer with Improved Focusing Properties," Physical Review, vol. 53, Apr. 1, 1938.
Boulyga, Sergei F. and Thomas Prohaska. "Determining the isotopic compositions of uranium and fission products in radioactive environmental microsamples using laser ablation ICP-MS with multiple ion counters," Analytical and Bioanalytical Chemistry 390, 531-539. (2008) 10.1007/s00216-007-1575-6.
Cremers, D.A., et al., Applied Spectroscopy 66(3): 250-261, Mar. 2012.
Donohue DL. Strengthening IAEA safeguards through environmental sampling and analysis. Journal of Alloys and Compounds. 1998;271-273:11-8. https://doi.org/10.1016/S0925-8388(98)00015-2.
Esaka et al., Identifying Uranium Particles Using Fission Tracks and Microsampling Individual Particles for Analysis Using Thermal Ionization Mass Spectrometry. Anal Chem. 2015;87(5):3107-13. 10.1021/acs.analchem.5b00236.
Evans, S., [3] Detectors. In Methods in Enzymology, Academic Press: 1990; vol. vol. 193, pp. 61-86.
Felton, J. A., G. D. Schilling, S. J. Ray, R. P. Sperline, M. B. Denton, C. J. Barinaga, D. W. Koppenaal and G. M. Hieftje (2011). "Evaluation of a fourth-generation focal plane camera for use in plasma-source mass spectrometry." Journal of Analytical Atomic Spectrometry 26(2): 300-304.
Frank, M, Gard EE, Tobias HJ, Adams KL, Bogan MJ, Coffee KR, Farquar GR, Fergenson DP, Martin SI, Pitesky M, Riot VJ, Srivastava A, Steele PT, Williams AM. Single-Particle Aerosol Mass Spectrometry (SPAMS) for High-Throughput and Rapid Analysis of Biological Aerosols and Single Cells. Rapid Characterization of Microorganisms by Mass Spectrometry: American Chemical Society; 2011. p. 161-96. doi:10.1021/bk-2011-1065.ch01010.1021/bk-2011-1065.ch010.
Laskin et al., "Mass spectrometric approaches for chemical characterisation of atmospheric aerosols: critical review of the most recent advances," . Environ. Chem. 9, 163-189. (2012) http://dx.doi.org/10.1071/EN12052.
Martin AN, Farquar GR, Gard EE, Frank M, Fergenson DP. Identification of High Explosives Using Single-Particle Aerosol Mass Spectrometry. Anal Chem. 2007;79(5):1918-25. 10.1021/ac061581z.
Martin, Audrey N., George R. Farquar, A. Daniel Jones, and Matthias Frank"The non-destructive identification of solid over-the-counter medications using single particle aerosol mass spectrometry," . Rapid Commun. Mass Spectrom. 21, 3561-3568. (2007) 10.1002/rcm.3248.
Morrison, KA, Denis EH, Nims MK, Broderick AM, Fausey RC, Rose HJ, Gongwer PE, Ewing RG. Vapor Pressures of RDX and HMX Explosives Measured at and Near Room Temperature: 1,3,5-Trinitro-1,3,5-triazinane and 1,3,5,7-Tetranitro-1,3,5,7-tetrazocane. The Journal of Physical Chemistry A. 2021;125(5):1279-88. 10.1021/acs.jpca.0c10409.
Piacentino et al., "The Long Neglected Cycloidal Mass Analyzer," (2021) Intended Conference: Pittcon https://pittcon.org/.
Sella Srbr, Vandenberghe LPS, Soccol CR. Bacillus atrophaeus: main characteristics and biotechnological applications—a review. Critical Reviews in Biotechnology. 2015;35(4):533-45. 10.3109/07388551.2014.922915.
Wang et al., "Ion Kinetic Energy Distributions in Laser-Induced Plasma," Spectrochimica Acta Part B: Atomic Spectroscoopy 2014, 99, 101-114.
Zarzana, C. A., The Use of Capacitive Transimpedance Amplifier Array Detectors for Mass Spectrometry. The University of Arizona (2011).

* cited by examiner

VIRTUAL SLIT CYCLOIDAL MASS SPECTROMETER

CROSS-REFERENCE TO RELATED APPLICATIONS

This application is related to, claims priority to, and incorporates by reference herein for all purposes U.S. Provisional Patent Application No. 63/193,816, filed May 27, 2021.

STATEMENT REGARDING FEDERALLY FUNDED RESEARCH

Not Applicable.

BACKGROUND

Mass spectrometry is a current method of analyzing particles for their atomic and molecular structure. However, these devices are typically large and confined to established laboratory settings. Portable mass spec machines and similar devices do not have suitable performance to meet the needs of nuclear safety inspectors, including high sensitivity, ease of use, fast results, high accuracy, high resolution, and a large enough range of detection. Thus, there is an ongoing opportunity for improved systems and methods for mass analysis.

All nuclear processes, including those for energy production and weapons production, result in the release of trace amounts radioactive particulate matter into the environment. During an inspection at a nuclear facility, the presence of uranium and radioactivity in particulates is usually expected so the presence alone is not a good indicator of clandestine activities. However, the isotopic composition of the particulate matter is associated with specific nuclear processes. Precise and accurate measurement of the isotopic composition of single particles is necessary to distinguish between declared and clandestine activities and to assess the capability and intent to develop weapons of mass destruction.

As current fieldable instruments do not have sufficient resolution, dynamic range, or ratio accuracy to detect these differences, inspectors typically collect samples using swipes and then send the swipes to a laboratory for analysis. This is typically accomplished by thermal ionization mass spectrometry (TIMS), secondary ion mass spectrometry (SIMS), or laser ablation inductively coupled plasma mass spectrometry (LA-ICPMS). TIMS can be tedious and time consuming, limited to only a few particles per day. More recently, SIMS and LA-ICPMS require less sample preparation time but do not offer the sensitivity and isotope ratio accuracy of TIMS. TIMS, SIMS, and LA-ICPMS all involve collection of samples in the field and then transporting to the lab for analysis, which drastically reduces the speed of analysis and provides many opportunities for sample contamination. It also delays any decisions and actions that require the data from the inspection.

Therefore, there is a need for a portable, high-sensitivity instrument that has the speed, ease of sample collection, dynamic range, resolution, ratio accuracy, and sensitivity for isotopic characterization of single particles to fill the gap between the high performance laboratory-based instruments and currently available field instruments. The presently disclosed system can enable field analysis of isotope ratios not possible with present technology. This point of use analysis will dramatically improve the speed of analysis, minimize contamination probability caused by transport to the lab, and thus decrease the time for decision and action.

SUMMARY

The present disclosure is based, in part, on the goal to enable more sensitive field detection of certain isotopes of interest.

In one aspect, the present disclosure provides a virtual slit cycloidal mass spectrometer. The spectrometer includes an aerosol inlet and particle size, a virtual slit ionization system, a cycloidal mass analyzer, a two-sided capacitive transimpedance amplifier ion array detector, and a power supply and electronics. The aerosol inlet and particle sizer is adapted to select sample particles having a sample particle size of 50 μm or less and to introduce the sample particles into a virtual slit ionization system. The virtual slit ionization system includes an ionization source adapted to ionize the sample particles introduced by the aerosol inlet and particle sizer at a virtual slit location. The virtual slit ionization system is adapted to produce ionized sample having radial velocity within a first plane (x-y plane). The virtual slit ionization system includes a first ionized sample portal, a second ionized sample portal, a first ionized sample blocker, and a second ionized sample blocker. The first ionized sample portal spans a first range of angles in a positive direction along a first axis (y-axis) within the first plane. The second ionized sample portal spans a second range of angles in a negative direction along the first axis. The first ionized sample blocker covers a third range of angles in a positive direction along a second axis (x-axis) within the first plane that is normal to the first axis. The second ionized sample blocker covers a fourth range of angles in a negative direction along the second axis. The first, second, third, and fourth ranges of angles cover 360° within the first plane. The function of the ionization source acting on the particle and the arrangement of the portals and slits is such that a first portion of the ionized sample passes through the first ionized sample portal, a second portion of the ionized sample passes through the second ionized sample portal, and other portions of the ionized sample are blocked by the first and second ionized sample blocker. The cycloidal mass analyzer is positioned relative to the virtual slit ionization system to provide double focusing of the ionized sample that is independent of initial ionization energy and direction of the ionized sample leaving the virtual slit ionization system. The cycloidal mass analyzer has a magnetic field of 0.7 T or greater. The cycloidal mass analyzer has a magnetic field variation of 0.01% or less. The two-sided capacitive transimpedance amplifier ion array detector has a first array and a second array. The first array faces in the positive direction along the first axis. The second array faces in the negative direction along the first axis. The detector has a thickness and positioning relative to the virtual slit ionization system and the cycloidal mass analyzer such that at least a portion of the first portion of the ionized sample hits the second array and at least a portion of the second portion of the ionized sample hits the first array. The power supply and electronics are operatively coupled to the ionization source, the cycloidal mass analyzer, and the detector. The spectrometer has a resolution of at least 2000 or at least 3000, optionally at a m/z of 238.

In another aspect, the present disclosure provides a method of virtual slit mass spectrometer. The method includes: a) ionizing a sample at a virtual slit location within a virtual slit ionization system to produce ionized sample having a radial velocity within a first plane; b) receiving signals from a two-sided capacitive transimpedance amplifier ion array detector; and c) generating a mass spectrum of the ionized sample using the received signals. The virtual slit mass spectrometer can be as described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
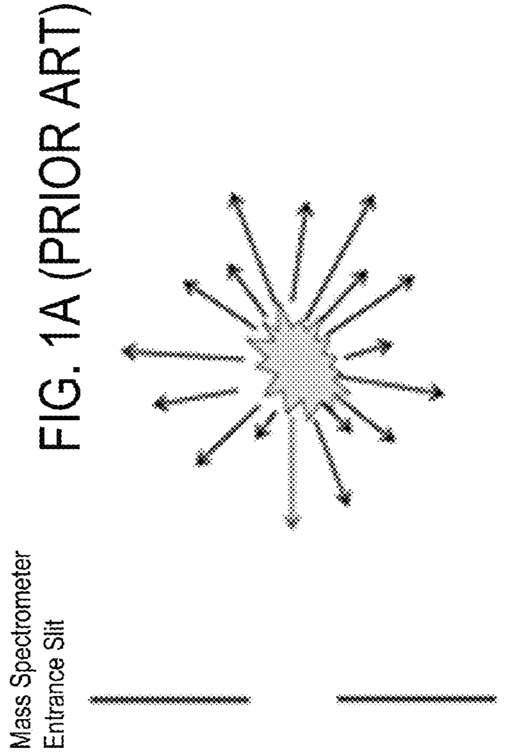
FIG. 1A (PRIOR ART)
FIG. 1A is an illustration of one ionization approach from the prior art.

Before the present invention is described in further detail, it is to be understood that the invention is not limited to the particular embodiments described. It is also understood that the terminology used herein is for the purpose of describing particular embodiments only and is not intended to be limiting. The scope of the present invention will be limited only by the claims. As used herein, the singular forms “a”, “an”, and “the” include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term “comprising” should be interpreted as referring to elements, components, or steps in a non-exclusive manner, so the referenced elements, components, or steps may be combined with other elements, components, or steps that are not expressly referenced. Embodiments referenced as “comprising” certain elements are also contemplated as “consisting essentially of” and “consisting of” those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

Cycloidal mass analyzers have unique focusing properties that are not found in any other type of mass analyzer. The focusing depends only on the mass to charge of the ion and not the velocity or direction that the ion enters the mass analyzer. However, the unique focusing properties of these mass analyzers have not been fully exploited due in part to the lack of suitable ion array detectors and the requirement that the ion source fit between the poles of the magnet. The present disclosure addresses these and other challenges by providing a portable cycloidal mass analyzer with high accuracy.

The inventors previously showed that the unique focusing properties of cycloidal mass analyzers are ideal for the application of spatially coded apertures to maintain throughput and resolution in a miniature mass spectrometer using a recently developed CMOS ion array detector. This research to demonstrate a coded aperture cycloidal mass spectrometer led to an insight about a way to employ the unique focusing properties of the cycloidal mass analyzer for analyzing the composition of single particles. In particular, the cycloidal mass analyzer focusing properties can enable using the particles as “virtual slits” to achieve high resolution in a small volume. By combining the cycloidal mass analyzer with the CMOS ion array detector, it is possible to construct a portable mass spectrometer with the resolution, dynamic range, sensitivity, and ratio accuracy for determining the isotopic composition of single particles. As described hereinbelow, such an instrument would fill the gap between high performance laboratory based instruments and lower-performance field instruments. The system disclosed herein can meet the performance needs of applications that are currently not well served, such as nuclear safety, as well as clinical care and environmental analysis in low-resource or remote settings.

One aspect of the present disclosure provides a new approach to single particle mass spectrometry using laser ionization of single particles in a cycloidal mass analyzer with a double sided ion array detector. Using the particle itself as a virtual slit is expected to enable portable instruments with the ease of sample collection, rapid analysis time, resolution, dynamic range, sensitivity, and isotope ratio accuracy required for nuclear non-proliferation efforts.

Single particle mass spectrometry (SPMS) has a wide variety of applications, such as atmospheric aerosol analysis, explosives trace detection, identification of pharmaceuticals, analysis and characterization of microorganisms and biological aerosols, and isotopic characterization of particulate matter. A typical SPMS is composed of four parts including an inlet, an ion source, a mass analyzer, and a detector. The inlet system for a SPMS usually includes an aerosol particle inlet that consists of a small nozzle between 100-200 μm and an aerodynamic lens system. Particles are sucked into the nozzle and the aerosol lens system sorts and sizes the particles entering the mass analyzer, eliminating the need for swipes or any sample preparation. Ionization is typically accomplished by pulsed laser ionization using a UV harmonic of a Nd: YAG laser or an excimer laser. Mass analysis is most often accomplished via a time-of-flight (TOF) mass analyzer and detection is usually accomplished using multichannel plate (MCP) amplifiers. These instruments are generally large and their dynamic range and isotope ratio accuracy are limited in comparison to sector instruments.

There are a number of challenges when developing a portable laser ionization single particle mass spectrometer applicable to isotope ratio characterization of nuclear material. These include; collection of the ions generated by the laser ionization, overcoming the throughput vs. resolution tradeoff in spectrometer miniaturization, and detector dynamic range and sensitivity.

Figure 1B:
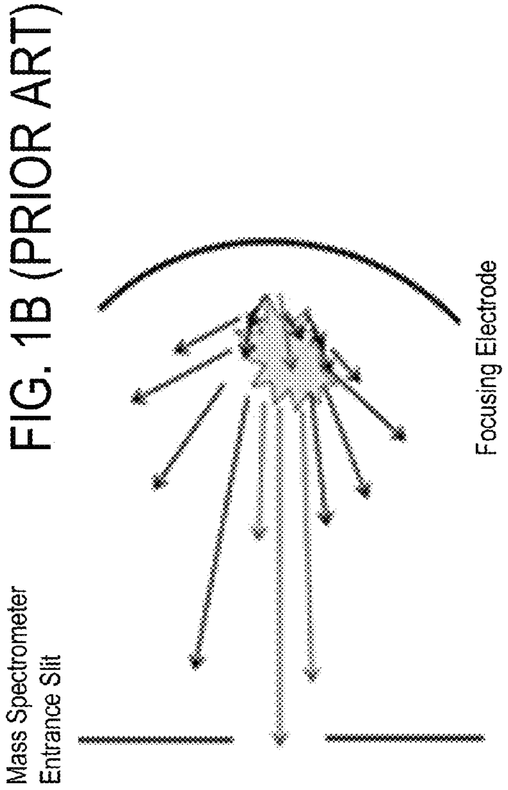
FIG. 1B (PRIOR ART)
FIG. 1B is an illustration of one ionization approach from the prior art.

When ionizing a particle with laser ionization, ions are created with trajectories in all directions with a wide energy spread (0-60 eV with peak around 20-30 eV). FIG. 1A shows that most ions produced by laser ionization do not reach the mass analyzer, leading to poor sensitivity. To increase analysis efficiency and sensitivity, a conventional mass spectrometer uses a focusing electrode to direct ions moving away from the slit back towards the slit (FIG. 1B). However, this leads to an increase in energy dispersion and many ions still do not reach the mass analyzer. Double focusing sector instruments and TOF instruments employing a reflectron can compensate for some energy and angular dispersion in the ion beam. However, a large instrument is required to adequately compensate for the dispersion and achieve the necessary resolution.

Figure 1C:
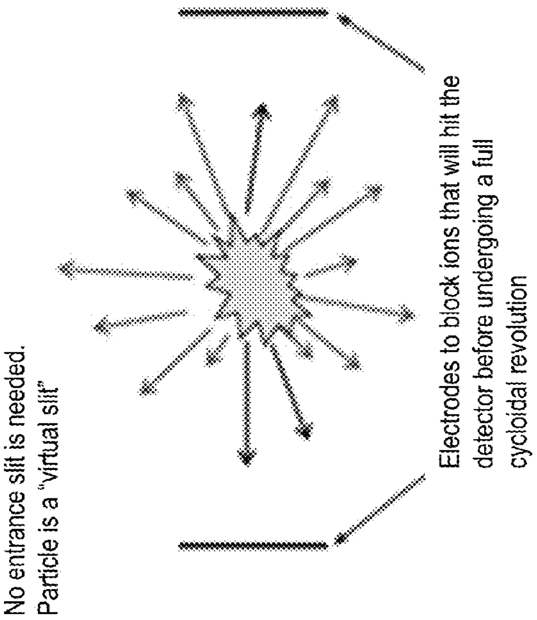
FIG. 1C is an illustration of the virtual slit ionization approach, in accordance with aspects of the present disclosure.

FIGS. 1A-1C show a comparison of different focusing options for laser ionization, leading to dramatically different ion utilization efficiencies. In the three cases, the arrows represent ion trajectories and their lengths represent the ion energy. Red arrows represent ions that enter the mass analyzer and are analyzed. Black arrows are lost and not analyzed. FIG. 1A depicts no focusing: laser ionization produces ions in all directions with a wide energy spread. In this case, only the ion with the red arrow enters the mass analyzer entrance slit. All other ions are lost and not analyzed. FIG. 1B depicts conventional focusing: in conventional mass analyzers, a focusing electrode is added to collect ions moving away from the mass analyzer. More ions enter the mass analyzer at the expense of increased energy dispersion. This requires a large instrument to compensate for the dispersion to and achieve sufficient resolution. FIG. 1C shows cycloidal focusing: the vast majority of ions enter the mass analyzer to be analyzed due to the unique focusing properties of the cycloidal mass analyzer. Only a small number of ions that would hit the detector before undergoing a full cycloidal revolution are blocked.

A second issue with portable instruments for SPMS, is that they suffer from a throughput vs. resolution tradeoff. In order to maintain high resolution when shrinking a sector-based mass spectrometer instrument, the entrance slit must also shrink, leading to lower throughput. With a TOF instrument, reducing the size of the instrument leads to decreased resolution due to ions of different mass-to-charge ratio reaching the detector with a smaller time difference. Resolution of >2000 (corresponding to a resolving power of ~ 0.12 amu) is required for isotopic separation. Currently, no miniature mass spectrometer has a resolution of >2000 at m/z=238.

Finally, the detector for a single particle mass spectrometer for isotopic ratio measurements must have a large dynamic range and high sensitivity. The difference in signal intensity between different mass-to-charge ratios can be 104 or greater for trace analytes in a particle. MCP detectors used with TOF instruments have a tradeoff between gain and dynamic range. To maximize sensitivity, it is desirable to operate the MCP at high gain. However, in order to minimize saturation and maximize dynamic range, it is desirable to operate at low gain. Furthermore, the gain of an MCP is dependent on the incident ion energy and mass. Therefore, a large energy dispersion will confound the ratio accuracy of isotope separation. Conventional (e.g., Channeltron®) electron multipliers for ion trap mass analyzers have similar issues. Faraday cup detectors used with sector analyzers have a very high dynamic range and a gain that is independent of ion energy and mass. However, they are far less sensitive than MCP and Channeltron® detectors.

The cycloidal mass analyzer coupled with a recently developed capacitive transimpedance amplifier (CTIA) ion array detector has the potential to address all three issues discussed above. Unlike other double-focusing sector mass analyzers, the perpendicularly oriented electric and magnetic fields have focusing that depends only on the m/z of the ion selected, and not on the velocity or direction of the particles entering the analyzer.

A charged particle in an electric field exhibits linear motion. A charged particle in a magnetic field exhibits circular motion. In perpendicularly oriented electric and magnetic fields, the charged particle exhibits circular motion with translation. The projection of the ion path in a plane perpendicular to the magnetic field is a cycloidal curve. Solving the equations of motion yields and equation for the pitch a, or displacement of the ion after it travels through one complete revolution:

$$a = \frac{m}{z}\frac{2\pi E}{B^2} \tag{1}$$

where m is the mass, z is the charge, E is the electric field, and B is the magnetic field. Note that this equation does not depend on the initial energy or angle of the ion. Therefore, in principle, ions can have any initial direction or energy and still be analyzed. In addition to perfect double focusing, cycloidal mass analyzers have numerous additional advantages, including compactness due to the overlapping electric and magnetic fields (other double focusing sector instruments have separate electric and magnetic sectors), low power (when using permanent magnets), a linear relationship between ion focus position and mass to charge ratio (other spatially resolving mass spectrometers have a non-linear relationship), and the high accuracy, precision, and abundance sensitivity of sector analyzers, which are preferred for isotope ratio measurements.

Cycloidal mass analyzers were initially used scanning instruments but lost popularity over time because they did not have significant advantages over the newly developed quadrupole mass filters and ion trap mass analyzers. However, recently there is renewed interest in cycloidal mass analyzers for portable instruments due to the unique focusing properties that make them ideal for use with spatially coded apertures. In addition, the recent development of high-quality ion detector arrays that can function in a magnetic field has also led to a renewed interest in cycloidal mass analyzers. These ion detector arrays are based on a capacitive transimpedance amplifier (CTIA) fabricated with CMOS technology which has a dynamic range exceeding that of a Faraday cup (1011) and sensitivity approaching that of a MCP (~5 ion detection limit). Furthermore, these detectors have a 100% fill factor, freedom from cross-talk between pixels, programmable gain, ability to operate in a magnetic field, sensitivity to both positive and negative charge, and a variety of other desirable characteristics.

Figure 2A:
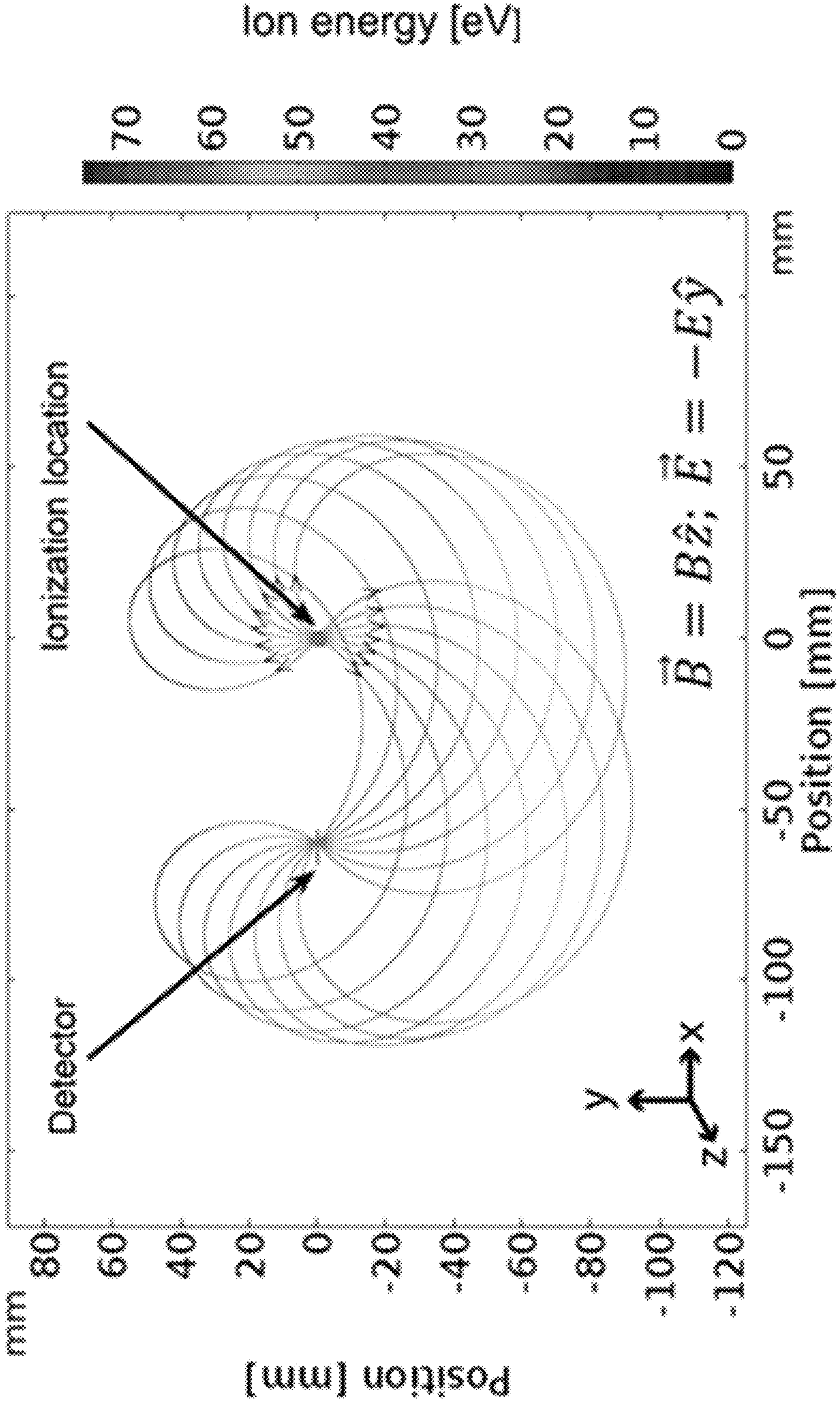
FIG. 2A is a plot of different cycloidal trajectories, in accordance with aspects of the present disclosure.
Figure 2B:
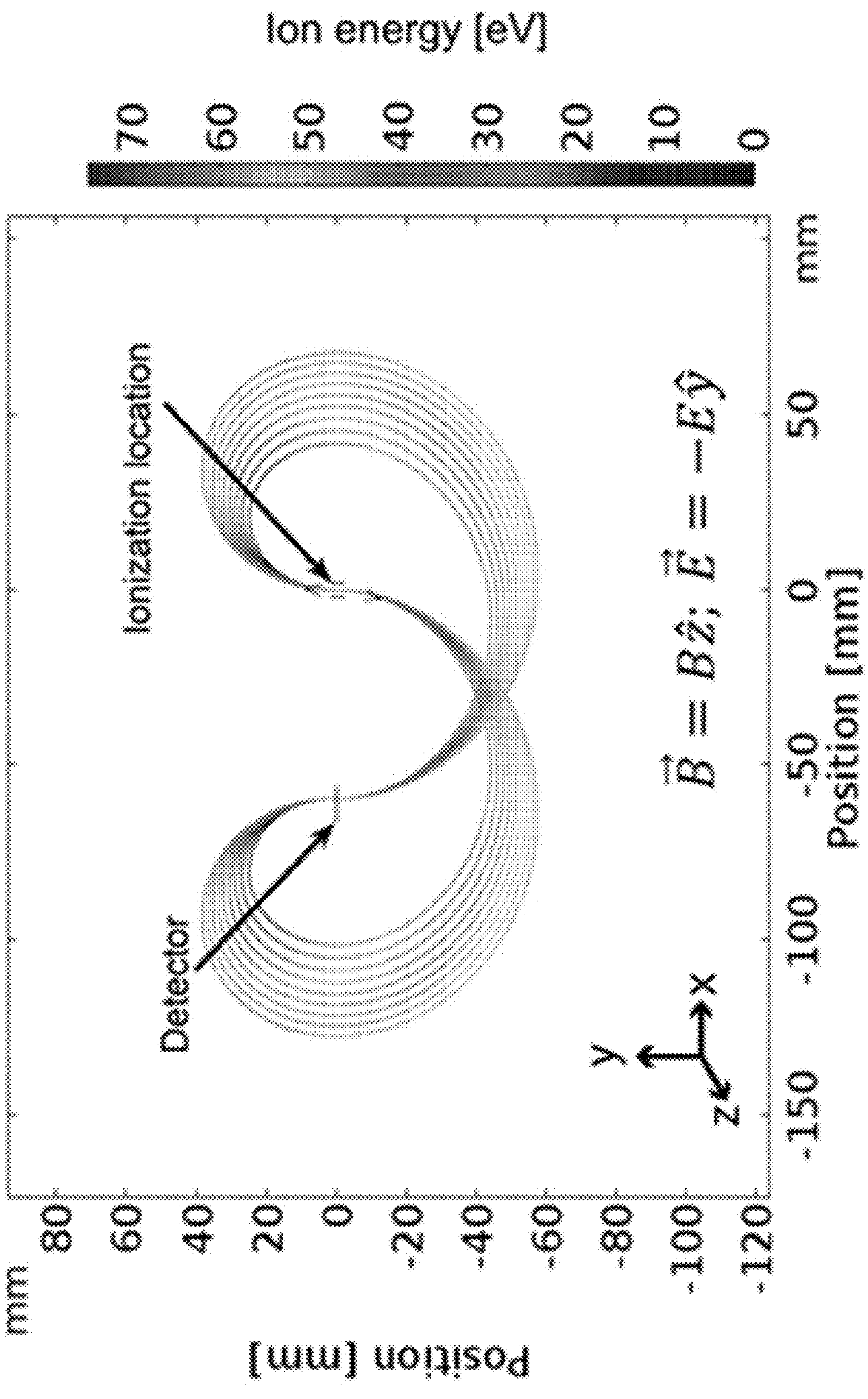
FIG. 2B is a plot of different cycloidal trajectories, in accordance with aspects of the present disclosure.
Figure 3:
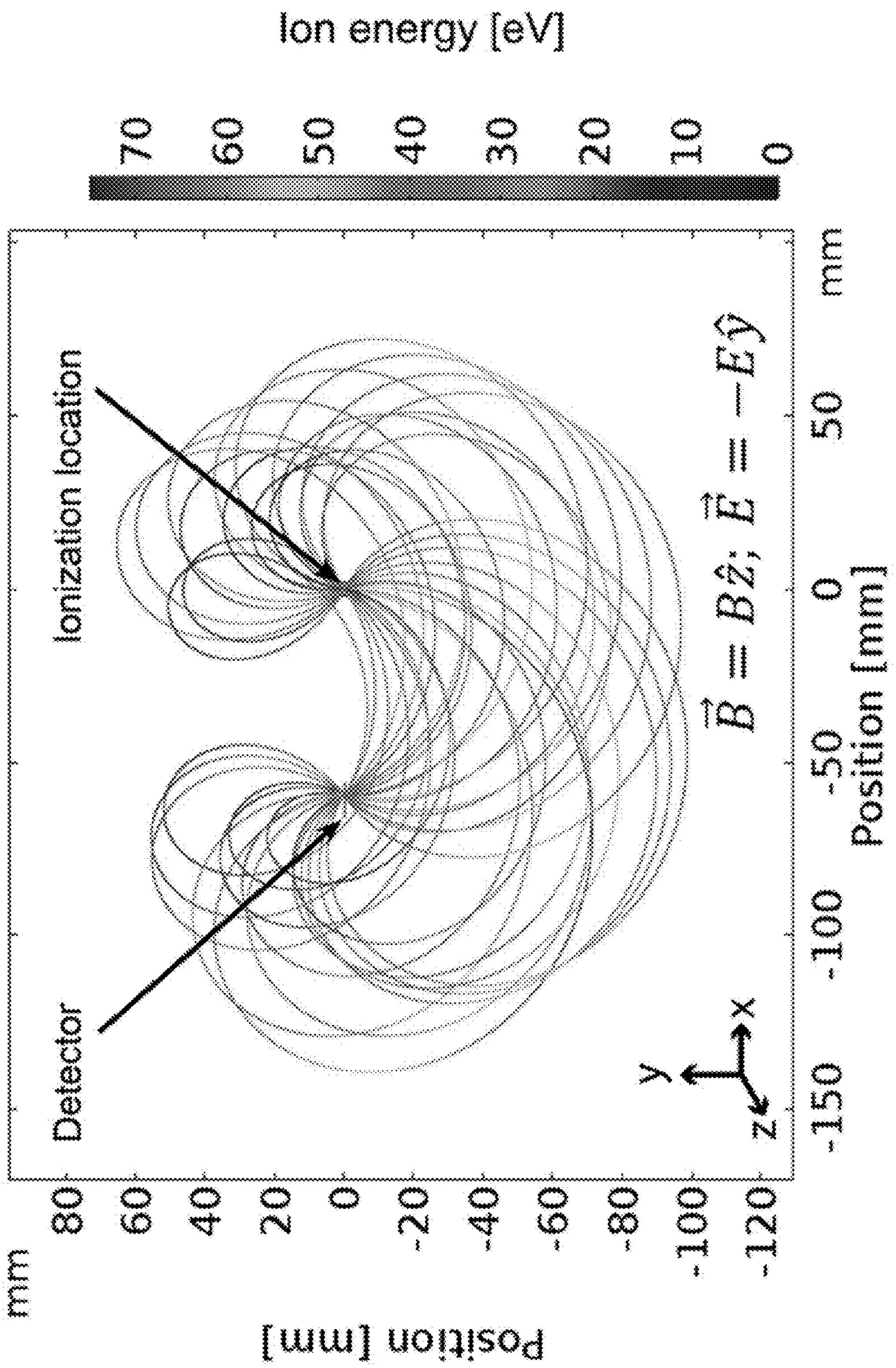
FIG. 3 is a plot of different cycloidal trajectories, in accordance with aspects of the present disclosure.

The perfect double focusing properties of the cycloidal mass analyzer provide a solution to the ion collection, resolution, and sensitivity issues discussed above. As the pitch a (see equation (1)) of the cycloidal analyzer does not depend on the initial energy or direction of the ion leaving the ion source, it can potentially collect ions emitted at all energies and angles. FIGS. 2A-3 show simulations using ions with mass to charge of 238, illustrating the ability of a cycloidal mass analyzer to correct for angular dispersion, energy dispersion, and a combination of both energy and angular dispersion. In practice, the size of the cycloidal path traced by the ion is determined by the ion energy (FIG. 2B) and a small cone of angles near the x-axis must be blocked as ions with these angles hit the detector before completing a full revolution of the cycloidal path (FIGS. 2A-3). In addition, a double-sided detector must be used to collect ions with initial velocities in both +y and −y directions. In summary, use of the cycloidal mass analyzer results in a significant increase in ion throughput for single particles ionized by laser ionization (see FIG. 1C).

FIG. 2A shows a simulation of a virtual slit cycloidal analyzer showing the ability to focus ions on the detector for a wide angular dispersion. FIG. 2B shows a simulation of a virtual slit cycloidal analyzer showing the ability to focus ions on the detector for a wide energy dispersion. In both FIGS. 2A and 2B, the ion source is at position (0,0) and the detector is a 10 mm wide strip extending along the x-axis from x=−56 mm to x=−66 mm. In FIG. 2A ions with m/z=238 have an energy of 30 eV and exit the ion source at all angles. In FIG. 2B, ions with an energy between 20 and 40 eV (in 2.5 eV steps) to simulate the energy dispersion encountered in laser ionization exit the ionization region in either the + or −y direction (i.e. no angular spread). The direction of the trajectories is indicated by a black arrowhead. A cone of ±22 degrees measured from the x-axis is blocked as ions exiting at these angles hit the detector before completing a full revolution of the cycloidal path. The magnitude of magnetic field is 0.3 T and the magnitude of the electric field is 345 V/m.

FIG. 3 shows a simulation of a virtual slit cycloidal mass analyzer. The ion source is at position (0,0), and the detector is a 10 mm wide strip extending along the x-axis from x=−56 mm to x=−66 mm. 238 amu ions with an energy distribution of 30±8 eV emanate from a 10 μm sphere in all directions. A cone of ±22 degrees measured from the x-axis is blocked as ions exiting at these angles hit the detector before completing a full revolution of the cycloidal path. The magnitude of magnetic field is 0.3 T and the magnitude of the electric field is 345 V/m.

As mentioned hereinabove, the application of spatially coded apertures to sector mass spectrometers can maintain resolution without sacrificing throughput when miniaturizing an instrument. With spatially coded apertures, the traditional slit at the exit of the ion source is replaced by an array of slits and the spectrum is computationally reconstructed. Using this technique, we have demonstrated up to a 12× increase in signal without loss in resolution for a variety of sector mass spectrometers including the cycloidal mass spectrometer. While spatially-coded apertures would provide a throughput increase for traditional single particle mass spectrometers, a key advantage when using the cycloidal mass analyzer for single particle analysis is that the focusing properties enable using the particle as a virtual slit, removing the need for an actual physical slit or coded aperture entirely. The particle size and geometry become the geometry of the virtual slit or aperture.

For a cycloidal mass analyzer, the resolution m/Δm (where m is the mass of the selected ion and Δm is the width of the base of the mass peak) is equivalent to a Δa (where a is the pitch of the selected mass to charge ratio and Δa is the sum of the ion source slit width and collector slit width (detector pixel size)). The size of the particle (0.5-10 μm) is significantly smaller than most slits used in mass spectrometry and therefore enables a small instrument with high resolution. With a 10 μm diameter particle, 10 μm wide detector pixels, and a 10 mm long detector, the configuration shown in FIG. 3 has resolution of ~3000 (corresponding to a resolving power of 0.08 amu), a mass range of 224-264 amu, and is just 30×30 cm. The mass range of the cycloidal mass analyzer depends on the desired resolving power, slit size, and detector size. Field magnitudes and can be tailored to the application of interest. For example, a mass range of 4-264 amu with a resolving power of 0.08 amu over the entire mass range could be achieved using the field configuration in FIG. 3 by extending the detector along the x-axis from x=−1 mm to x=−66 mm.

Figure 4:
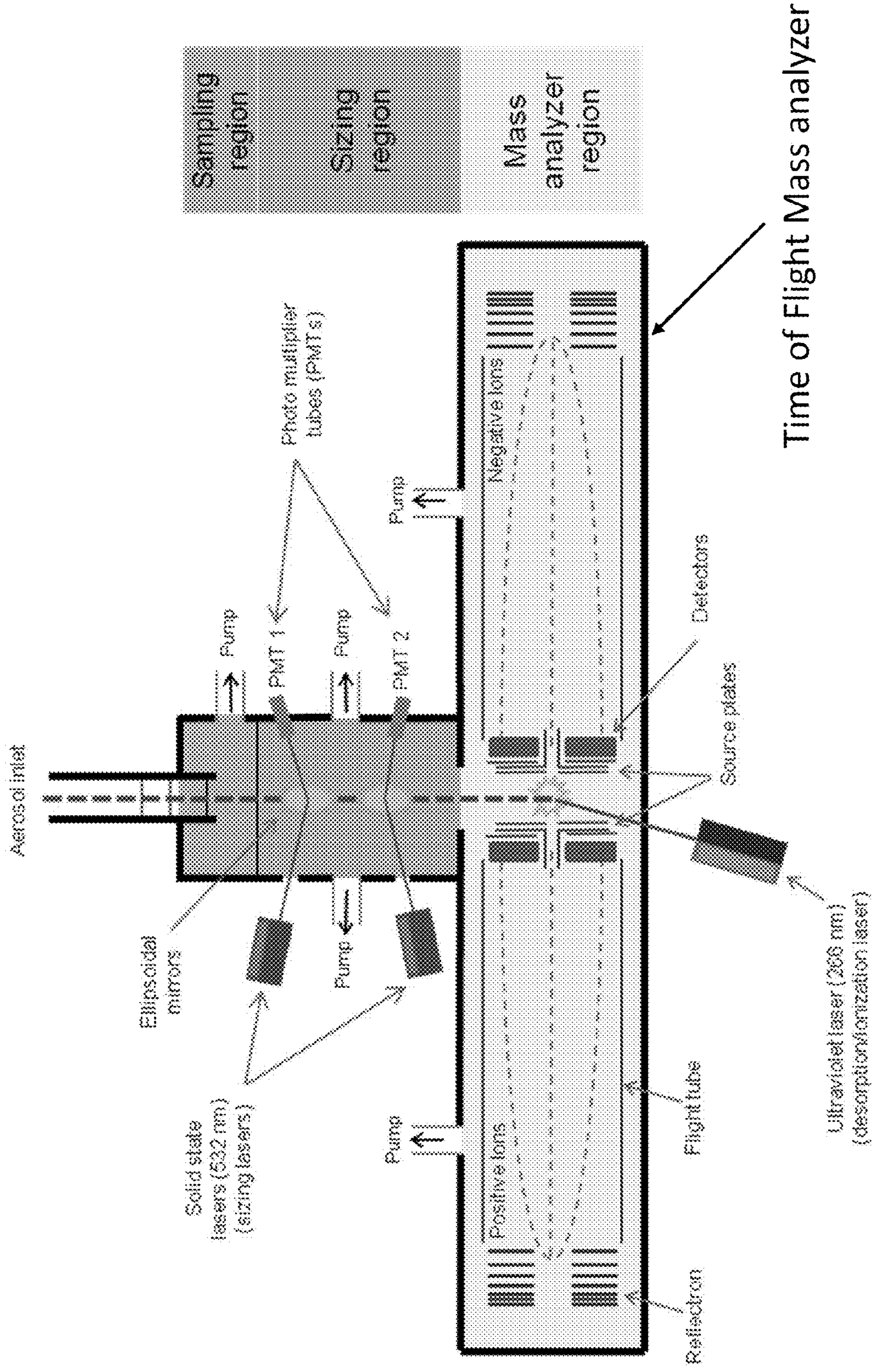
FIG. 4 (PRIOR ART)
FIG. 4 is a prior art portable mass spectrometer.

Referring to FIG. 4, a prior art portable mass spectrometer is illustrated, with a time-of-flight mass analyzer.

Figure 5:
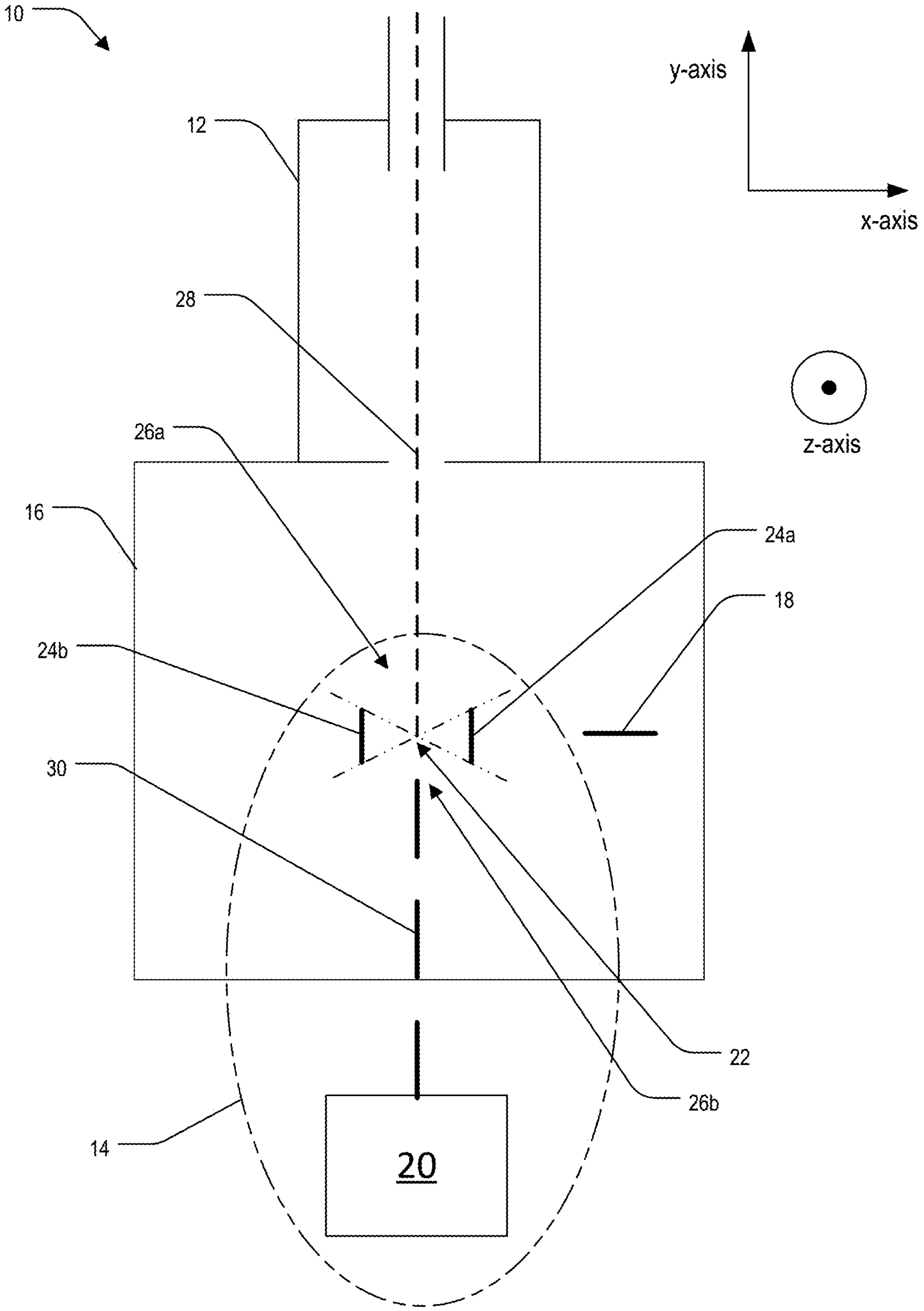
FIG. 5 is a virtual slit cycloid mass spectrometer, in accordance with aspects of the present disclosure.

Referring to FIG. 5, a virtual slit cycloidal mass spectrometer 10 is provided. The spectrometer 10 includes an aerosol inlet and particle sizer 12, a virtual slit ionization system 14, a cycloidal mass analyzer 16, a two-sided capacitive transimpedance amplifier ion array detector 18, and a power supply and electronics (not illustrated). The spectrometer 10 also includes various chambers, manifolds, and vacuum pumps to facilitate the necessary low pressures for mass spectrometry. The spectrometer 10 can have a resolution of at least 2000, or in some cases, at least 3000.

For orientation, the axes are labeled and the y-axis corresponds to the first axis, the x-axis corresponds to the second axis, and the z-axis corresponds to the third axis, as used herein. The first plane, as used herein, contains the x- and y-axes and is co-planar with the drawings sheet (i.e., the paper if printed or the screen/display if digital).

The aerosol inlet and particle sizer 12 can be conventional components that are used in trace analyte detections systems, as understood by those having ordinary skill in the art. The particle sizer portion can measure particle sizes using techniques understood by those having ordinary skill in the art. As one non-limiting example, the particle sizer can use sizing lasers, ellipsoidal mirrors, and photomultiplier tubes to measure particle size with techniques understood by those having ordinary skill in the art. The particle sizer can reject particles that exceed a predetermined size. In general, the aerosol inlet and particle sizer 12 provides a flow of sample particles 28 to the virtual slit location 22.

In some cases, the aerosol inlet and particle sizer 12 is adapted to introduce sample particles 28 having a desired particle size into the virtual slit ionization system 14 for the purpose of serving as a virtual slit, as described herein. Such particle sizes include, but are not limited to, a sample particle size of 50 μm or less, 10 μm or less, or the link. In some cases, the particle size can be between 0.5 μm and 10 μm.

The virtual slit ionization system 14 (the oval in FIG. 1 represents a grouping of sub-parts that comprise the virtual slit ionization system) is made up of three primary portions: an ionization source 20 (e.g., laser), a virtual slit location 22 where the energy 30 (e.g., light) from the ionization source 20 irradiates particles emerging from the aerosol inlet and particle sizer, and selective blocking of ionized sample by first and second ionized sample blockers 24 to produce a first and second ionized sample portals 26 therebetween.

The virtual slit ionization system 14 includes a first ionized sample portal 26*a* spanning a first range of angles in a positive direction along a first axis (y-axis) within the first plane. The virtual slit ionization system 14 includes a second ionized sample portal 26*b* spanning a second range of angles in a negative direction along the first axis within the first plane. The virtual slit ionization system 14 includes a first ionized sample blocker 24*a* covering a third range of angles in a positive direction along the second axis (x-axis) that is normal to the first axis within the first plane. The virtual slit ionization system 14 includes a second ionized sample blocker 24*b* covering a fourth range of angles in a negative direction along the second axis (x-axis) within the first plane. The first, second, third, and fourth range of angles covers 360° (i.e., fully) within the first plane.

In some cases, the ionized sample blockers 24 can be electrodes that absorb ions on contact.

In general, the ranges of angles can be tuned for performance, balancing the factors relating to growing and shrinking the ranges, as discussed elsewhere herein and in the aforementioned provisional patent application, which is incorporated herein in its entirety by reference. In some cases, the first range of angles is between −60° and +60° along the positive direction of the first axis, the second range of angles is between −60° and +60° along the negative direction of the first axis, the third range of angles is between −30° and +30° along the positive direction of the second axis, and the fourth range of angles is between −30° and +30° along the negative direction of the second axis. In some cases, the first range of angles is between −68° and +68° along the positive direction of the first axis, the second range of angles is between −68° and +68° along the negative direction of the first axis, the third range of angles is between −22° and +22° along the positive direction of the second axis, and the fourth range of angles is between −22° and +22° along the negative direction of the second axis.

The virtual slit ionization source 20 can be any source based on any ionization technique that produces a localized source of ions. The virtual slit ionization source 20 can direct energy 30 to the virtual slit location 22.

In some cases, the virtual slit ionization source 20 can be a virtual slit ionization laser. The virtual slit ionization laser 20 can be a Nd: YAG laser or an excimer laser. The ionizing laser 20 can direct light 30 to the virtual slit location. The light 30 itself can be a UV harmonic from tone of these lasers. In some cases, the light 30 is focused. In cases where the light is focused, the light can have a focal size of 50 μm or less or 10 μm or less at the virtual slit location 22.

In cases where the virtual slit ionization source 20 is not a laser, ionization can be accomplished by an electrical spark, an electron beam, or other sources capable of generating ions in a small volume.

The virtual slit ionization source and/or laser 20 can be adapted to impart a desired amount of energy into the ionized sample, including but not limited to, 75 eV or less or energy, 60 eV or less of energy, between 0 and 60 eV of energy, or between 20 and 30 eV of energy.

The cycloidal mass analyzer 16 includes all required magnets, magnetic or electric field generators, vacuum chambers, vacuum pumps, and other aspects that a skilled artisan would recognize as being associated with a cycloidal mass analyzer 16. The cycloidal mass analyzer 16 (and its corresponding fields) is positioned relative to the virtual slit ionization system 14 to provide double focusing of the ionized sample. The double focusing here is independent of initial ionization energy. The double focusing here is independent of the direction that the ionized sample is traveling as it leaves the virtual slit ionization system.

The cycloidal mass analyzer can have a magnetic field of 0.7 T or greater. The cycloidal mass analyzer can have a magnetic field variation of 0.01% or less over the paths that are traveled by the ionized sample.

The cycloidal mass analyzer is adapted to resolve ionized sample having a mass-to-charge ratio of 300 or less.

The result of the double-focusing should be appreciated by those having ordinary skill in the art. The portion of the ionized sample that passes through the first ionized sample portal 26*a* (i.e., in the positive direction of the first axis) will arrive at the detector 18 from the negative direction of the first axis. Similarly, the portion of the ionized sample that passes through the second ionized sample portal 26*b* (i.e., in the negative direction of the first axis) will arrive at the detector 18 from the positive direction of the first axis. The position along the second axis where the various ions arrive corresponds to the mass-to-charge ratio. In this fashion, the pixels on the detector can "bin" the ions into categories of mass-to-charge ratio.

The two-sided capacitive transimpedance amplifier ion array detector 18 has a thickness and is oriented and positioned to take advantage of this performance capability. The pixels of the arrays of the detector 18 are located at desired positions along the second axis, corresponding to desired mass-to-charge ratios. The detector 18 includes a first array facing in the positive direction along the first axis and a second array facing in the negative direction along the first axis. As far as thickness is concerned, the active elements of the array detector 18 can be as thin as practical, so long as the performance of each element remains intact. As far as orientation, the detector 18 is oriented generally such that the first and second array are parallel to the second axis. As far as positioning, the detector 18 is positioned to place the pixels in the array at positions that correspond to mass-to-charge ratios of interest.

The detector 18 and its arrays also have the necessary size to take advantage of the double-focusing performance capability. The length of the arrays in the second direction (x-axis) determines the range of mass-to-charge ratios that are covered by the detector. Longer arrays provide a greater range of ratios. The width of the arrays in the third direction (z-axis) provides the ability to capture ionized sample that has defocused as it travels a cycloidal path. In other words, widening (in the third direction/z-axis) the detector arrays increases the number of ions collected and enhances signal up to the point at which the detector arrays are wider than the distribution of ionized sample.

The spectrometer 10 can be field-deployable.

The power supply and electronics are those that a skilled artisan would appreciate being necessary for connection and operation of the spectrometer. To the extent that specific details are required to implement the power supply and electronics, the details are either present in the provisional application to which this application claims priority (which is incorporated by reference for all purposes) or the knowledge of an ordinarily skilled artisan.

The present disclosure also provides a method of virtual slit cycloidal mass spectrometry. The method is combinable with all features of the system described herein or in the provisional application to which this application claims priority, which is incorporated herein by reference for all purposes, unless the context clearly dictates otherwise.

The method includes: a) ionizing a sample at a virtual slit location within a virtual slit ionization system to produce ionized sample having a radial velocity within a first plane; b) receiving signals from a two-sided capacitive transimpedance amplifier ion array detector; and c) generating a mass spectrum of the ionized sample using the received signals. The method includes additional features, as described above with respect to the spectrometer.

The method can be performed outside of a laboratory, using the field-deployable version of spectrometer 10.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise.

The present disclosure shall control in the event there are any disparities between any definitions and/or description found in the cited references.

We claim:

1. A virtual slit cycloidal mass spectrometer comprising:

an aerosol inlet and particle sizer adapted to select sample particles having a sample particle size of 50 μm or less and to introduce the sample particles into a virtual slit ionization system;

the virtual slit ionization system comprising an ionization source adapted to ionize the sample particles introduced by the aerosol inlet and particle sizer at a virtual slit location, wherein the virtual slit ionization system is adapted to produce ionized sample having radial velocity within a first plane, the virtual slit ionization system including a first ionized sample portal spanning a first range of angles in a positive direction along a first axis within the first plane and a second ionized sample portal spanning a second range of angles in a negative direction along the first axis, the ionization system including a first ionized sample blocker covering a third range of angles in a positive direction along a second axis within the first plane that is normal to the first axis and a second ionized sample blocker covering a fourth range of angles in a negative direction along the second axis, wherein the first, second, third, and fourth ranges of angles cover 360° within the first plane, such that a first portion of the ionized sample passes through the first ionized sample portal, a second portion of the ionized sample passes through the second ionized sample portal, and other portions of the ionized sample are blocked by the first and second ionized sample blockers;

a cycloidal mass analyzer positioned relative to the virtual slit ionization system to provide double focusing of the ionized sample that is independent of initial ionization energy and direction of the ionized sample leaving the virtual slit ionization system, the cycloidal mass analyzer having a magnetic field of 0.7 T or greater and a magnetic field variation of 0.01% or less;

a two-sided capacitive transimpedance amplifier ion array detector having a first array facing in the positive direction along the first axis and a second array facing in the negative direction along the first axis, wherein the two-sided capacitive transimpedance amplifier ion array detector has a thickness and a positioning relative to the virtual slit ionization system and the cycloidal mass analyzer such that at least a portion of the first portion of the ionized sample hits the second array and at least a portion of the second portion of the ionized sample hits the first array; and a power supply and electronics operatively coupled to the ionization source, the cycloidal mass analyzer, and the two-sided capacitive transimpedance amplifier ion array detector, wherein the virtual slit cycloid mass spectrometer has a resolution of at least 2000.

2. The virtual slit cycloidal mass spectrometer of claim 1, wherein the virtual slit ionization source is a virtual slit laser ionization source and the laser spot size is 50 μm or less at the virtual slit location.

3. The virtual slit cycloidal mass spectrometer of claim 1, wherein the sample particle size is 10 μm or less.

4. The virtual slit cycloidal mass spectrometer of claim 1, wherein either:

the first range of angles is between −60° and +60° along the positive direction of the first axis, the second range of angles is between −60° and +60° along the negative direction of the first axis, the third range of angles is between −30° and +30° along the positive direction of the second axis, and the fourth range of angles is between −30° and +30° along the negative direction of the second axis; or the first range of angles is between −68° and +68° along the positive direction of the first axis, the second range of angles is between −68° and +68° along the negative direction of the first axis, the third range of angles is between −22° and +22° along the positive direction of the second axis, and the fourth range of angles is between −22° and +22° along the negative direction of the second axis.

5. The virtual slit cycloidal mass spectrometer of claim 1, wherein the resolution is at least 3000.

6. The virtual slit cycloidal mass spectrometer of claim 1, wherein the resolution is determined at a mass-to-charge ratio of 238.

7. The virtual slit cycloidal mass spectrometer of claim 1, wherein the two-sided capacitive transimpedance amplifier ion array detector has a width in a third direction normal to the first plane of at least 10 μm.

8. The virtual slit cycloidal mass spectrometer of claim 1, the system including NiFeB permanent magnets to establish the uniform magnetic field.

9. The virtual slit cycloidal mass spectrometer of claim 1, wherein an ionizing laser is adapted to impart the ionized sample with 75 eV or less of energy.

10. The virtual slit cycloidal mass spectrometer of claim 1, wherein the cycloidal mass analyzer is adapted to resolve and the two-sided capacitive transimpedance amplifier ion array detector is adapted to detect ionized sample having a mass-to-charge ratio of 300 or less.

11. The virtual slit cycloidal mass spectrometer of claim 1, wherein the double focusing provided by the cycloidal mass analyzer results in a linear relationship between the position along the second axis to which the ionized sample is focused and mass-to-charge ratio.

12. The virtual slit cycloidal mass spectrometer of claim 1, wherein the cycloidal mass analyzer comprises one or more out-of-plane focusing elements adapted to apply a force to the ionized sample that has a directional component that is toward the first plane.

13. The virtual slit cycloidal mass spectrometer of claim 1, wherein the first and second ionized sample blockers are first and second blocking electrodes.

14. The virtual slit cycloidal mass spectrometer of claim 1, wherein the spectrometer is field-deployable.

15. A method of virtual slit cycloidal mass spectrometry, the method comprising:

a) ionizing a sample at a virtual slit location within a virtual slit ionization system to produce ionized sample having a radial velocity within a first plane;

b) receiving signals from a two-sided capacitive transimpedance amplifier ion array detector; and
c) generating a mass spectrum of the ionized sample using the received signals,
wherein the ionizing of step a) uses a laser spot size of 50 μm or less and/or a particle size of 50 μm or less,
wherein the virtual slit ionization system includes ionized sample portals in a positive direction along a first axis within the first plane and a negative direction along the first axis,
wherein the virtual slit ionization system includes ionized sample blockers in a positive direction along a second axis within the first plane that is normal to the first axis and a negative direction along the second axis,
wherein the ionized sample portals cover a first range of angles in the positive direction along the first axis and a second range of angles in the negative direction along the first axis,
wherein the ionized sample blockers cover a third range of angles in the positive direction along the second axis and a third range of angles in the negative direction along the second axis,
wherein the first, second, third, and fourth ranges of angles cover 360° within the first plane, such that first and second portions of the ionized sample pass through the ionized sample portals and other portions of the ionized sample are blocked by the ionized sample blockers,
wherein the virtual slit location is positioned within a cycloidal mass analyzer that is positioned relative to the virtual slit ionization system to provide double focusing of the ionized sample that is independent of the initial ionization energy and direction of the ionized sample leaving the virtual slit ionization system,
wherein the cycloidal mass analyzer has a magnetic field of 0.7 T or greater,
wherein the cycloidal mass analyzer has a magnetic field variation of 0.01% or less,
wherein the two-sided capacitive transimpedance amplifier ion array detector has a first array and a second array,
wherein the first array faces in the positive direction along the first axis,
wherein the second array faces in the negative direction along the first axis,
wherein the two-sided capacitive transimpedance amplifier ion array detector has a thickness and a positioning relative to the virtual slit ionization system and the cycloidal mass analyzer such that at least a portion of the first portion of the ionized sample hits the second array and at least a portion of the second portion of the ionized sample hits the first array,
wherein the mass spectrum has a resolution of at least 2000.

16. The method of claim 15, wherein the ionizing of step a) includes a particle size of 10 μm or less.

17. The method of claim 15, applying out-of-plane focusing to the ionized sample, thereby applying a force to the ionized sample that has a direction component that is toward the first plane.

18. The method of claim 15, the method further comprising, prior to step a), harvesting sample particles, measuring sample particle size, and directing particles that are 10 μm or less to the virtual slit ionization system.

19. The method of claim 15, wherein the ionizing of step a) is adapted to impart the ionized sample with 75 eV or less of energy.

20. The method of claim 15, wherein the method is performed outside of a laboratory and using a field-deployable virtual slit cycloidal mass spectrometer.

* * * * *